United States Patent [19]

Frank et al.

[11] Patent Number: 6,080,475
[45] Date of Patent: Jun. 27, 2000

[54] COMPOSITE MATERIAL CONTAINING AEROGEL, PROCESS FOR MANUFACTURING THE SAME AND THE USE THEREOF

[75] Inventors: Dierk Frank, Hofheim; Andreas Zimmermann, Griesheim; Helmut Stuhler, Nürnberg, all of Germany

[73] Assignee: Hoechst Aktiengesellschaft, Frankfurt, Germany

[21] Appl. No.: 08/849,297

[22] PCT Filed: Nov. 22, 1995

[86] PCT No.: PCT/EP95/04599

§ 371 Date: Aug. 13, 1997

§ 102(e) Date: Aug. 13, 1997

[87] PCT Pub. No.: WO96/15997

PCT Pub. Date: May 30, 1996

[30] Foreign Application Priority Data

Nov. 23, 1994 [DE] Germany ............................ 44 41 567

[51] Int. Cl.[7] .................. B32B 5/16; B32B 13/10
[52] U.S. Cl. ............ 428/331; 428/36.5; 428/294.7; 428/323; 264/640; 264/642
[58] Field of Search ..................... 428/446, 454, 428/304.4, 306.6, 307.3, 36.5, 312.6, 317.9, 331, 323, 294.7; 156/244.1; 264/6, 13, 623, 642

[56] References Cited

U.S. PATENT DOCUMENTS

| | | | |
|---|---|---|---|
| 3,965,020 | 6/1976 | Noll et al. | 252/62 |
| 4,230,765 | 10/1980 | Takahashi et al. | 427/283 |
| 4,363,738 | 12/1982 | Kummermehr | 252/62 |
| 4,399,175 | 8/1983 | Kummermehr et al. | 428/76 |
| 4,954,327 | 9/1990 | Blount | 423/338 |
| 5,122,291 | 6/1992 | Wolff et al. | 252/62 |
| 5,137,927 | 8/1992 | Wolff et al. | 521/51 |
| 5,294,480 | 3/1994 | Mielke et al. | 428/240 |
| 5,306,555 | 4/1994 | Ramaurthi et al. | 428/289 |
| 5,569,513 | 10/1996 | Fidler et al. | 428/35.6 |

FOREIGN PATENT DOCUMENTS

| | | |
|---|---|---|
| 0027633 | 4/1981 | European Pat. Off. . |
| 0340707 | 11/1989 | European Pat. Off. . |

*Primary Examiner*—Timothy M. Speer
*Assistant Examiner*—Stephen Stein
*Attorney, Agent, or Firm*—Frommer Lawrence & Haug LLP

[57] ABSTRACT

A composite material comprising aerogel, a process for its preparation, and its use. The invention relates to a composite material comprising from 10 to 95% by volume of aerogel particles and at least one inorganic binder, a process for its preparation, and its use.

11 Claims, No Drawings

COMPOSITE MATERIAL CONTAINING AEROGEL, PROCESS FOR MANUFACTURING THE SAME AND THE USE THEREOF

The invention relates to a composite material comprising from 10 to 95% by volume of aerogel particles and at least one inorganic binder, a process for its preparation, and its use.

Most non-porous, inorganic solids have relatively high thermal conductivity, since heat is conducted efficiently through the solid material. In order to achieve lower thermal conductivities, use is therefore often made of porous materials, e.g. based on vermiculites. In a porous body, there remains only a solid framework which can transmit heat efficiently, whereas the air in the pores, is in comparison with the solid body, transmits less heat.

However, pores in a solid generally lead to a deterioration in its mechanical stability, because stresses can be transmitted only through the framework. Therefore, porous, but still mechanically stable materials likewise have relatively high thermal conductivity.

For many applications, however, a very low thermal conductivity in conjunction with good mechanical strength, i.e. high compressive and flexural strengths, is desirable. Firstly, shaped articles need to be machined, and secondly, depending on the application, they must be able to withstand mechanical loads without fracture or cracking, even at elevated temperatures.

Because of their very low density, high porosity and small pore diameter, aerogels, especially those having porosities greater than 60% and densities less than 0.6 g/cm$^3$, have extremely low thermal conductivities and therefore find application as heat-insulating materials, as described, for example, in EP-A-0 171 722. The small pore diameters, less than the mean free path of air molecules, are particularly important for low thermal conductivity, since they give rise to a lower thermal conductivity for the air in the pores than for air in macropores. Therefore, the thermal conductivity of aerogels is even smaller than that of other materials having similar porosity values but larger pore diameters, such as e.g. foams or materials based on vermiculites.

However, the high porosity also gives rise to low mechanical stability, both of the gel from which the aerogel is dried and also of the dried aerogel itself.

Aerogels in the widest sense, i.e. in the sense of "gels containing air as dispersion medium" are produced by drying a suitable gel. The term "aerogel" in this sense includes aerogels in the narrower sense, xerogels and cryogels. A dried gel is referred to as an aerogel in the narrower sense if the gel liquid is removed at temperatures above the critical temperature and starting from pressures above the critical pressure. If, by contrast, the gel liquid is removed subcritically, for example with formation of a liquid-vapor boundary phase, the resulting gel is often also referred to as a xerogel. It should be noted that the gels according to the invention are aerogels in the sense of gels containing air as dispersion medium.

For many applications, however, it is necessary to use aerogels in shaped articles having adequate mechanical stability.

EP-A-0 340 707 discloses an insulating material having a density of from 0.1 to 0.4 g/cm$^3$ comprising at least 50% by volume of silica aerogel particles having a diameter between 0.5 and 5 mm, bound together by at least one organic and/or inorganic binder. The comparatively coarse particle size has the result that shaped articles produced from the insulating material have an inhomogeneous distribution of the aerogel material. This applies especially if the smallest typical dimensions of the shaped articles, which in films or sheets is the thickness, is not very much greater than the typical diameter of aerogel particles. Especially at the perimeters, an increased binder proportion would be necessary, which would have an adverse effect on the thermal conductivity of the shaped article, particularly at the surface.

Furthermore, in a shaped article made from this insulating material, regions of low mechanical stability with diameters between 0.5 and 5 mm and comprising aerogel material would appear at the surface and, under mechanical loads, could eventually give rise to surface irregularities with diameters or depths up to 5 mm through destruction of the aerogels at the surface.

In addition, it is not easy to prepare insulating materials of this type which include only a small proportion of liquid, since, in the processes indicated in EP-A-0 340 707, the aerogel particles, because of their low mechanical strength, can easily be destroyed by shearing processes during mixing.

The object of the invention is therefore to provide a composite material based on aerogels which has low thermal conductivity and high mechanical strength.

This object is achieved by means of a composite material comprising from 10 to 95% by volume of aerogel particles and at least one inorganic binder, wherein the diameter of the aerogel particles is less than 0.5 mm.

The inorganic binder(s) form(s) a matrix which binds the aerogel particles and extends as continuous phase through the entire composite material.

At an aerogel particle content of significantly below 10% by volume in the composition, the advantageous properties of the composition would, because of the low proportion of aerogel particles, to a large extent be lost. Compositions of this type would no longer have low densities and thermal conductivities.

An aerogel particle content of significantly greater than 95% by volume would give a binder content of less than 5% by volume, which is too low to ensure adequate binding of the aerogel particles to one another and adequate mechanical compressive and flexural strength.

The proportion of aerogel particles is preferably in the range from 20 to 90% by volume.

According to the invention, the particle diameter of the aerogel particles is less than 0.5 mm, preferably less than 0.2 mm. The particle diameter refers to the mean diameter of the individual aerogel particle, since the method of preparation of the aerogel particles, for instance by milling, means that they need not necessarily have a spherical shape.

The use of small aerogel particles gives a more homogeneous distribution in the composition, so that the composite material has an almost uniform, low thermal conductivity at all points, in particular even at the surfaces.

Furthermore, small aerogel particles at the same aerogel proportion give improved mechanical stability with respect to formation of fractures and cracks, since local build-up of stresses under load is reduced.

Aerogels can be hydrophilic or hydrophobic, depending on the material and on the type of surface groups on the pore surfaces.

If hydrophilic aerogels come into contact with polar materials, in particular water, in vapor or liquid form, the pore structure may become weakened, depending on the duration of the action and on the physical condition of the material; in unfavorable cases, a hydrophilic aerogel may even collapse.

This alteration of the pore structure, in particular a collapse, may give rise to a drastic deterioration in the thermal insulation efficiency.

Taking into consideration the possible presence of moisture (as water) in the composite material, for example as a result of condensation of atmospheric moisture during temperature changes, and the production process, which typically involves water, hydrophobic aerogels are therefore preferred.

In order to avoid a deterioration in the insulation efficiency of the composite material under the influence of moisture and/or of the ambient atmosphere during the long service life which is expected of typical shaped articles produced from the composite material, aerogels which remain hydrophobic over long periods of time, even in slightly acid environments, are particularly preferred.

When aerogel particles having hydrophobic surface groups are used, the use of very small particle diameters gives a hydrophobic ceramic material, since the hydrophobic aerogel has a uniform and very fine distribution.

A particularly high proportion of aerogel particles in the composite material can be achieved by using a bimodal distribution of the particle sizes.

Preferred inorganic binders are cement, lime or gypsum, and mixtures of these. Other inorganic binders, such as those based on silica sol, may also be used.

The inorganic binders constitute an excellent basis for the production of shaped articles from aerogel. Hydraulic setting gives a very fine structure of high strength. The combination of inorganic binders and aerogel gives the shaped article properties which are exactly those which are desired for applications e.g. in the building sector.

The composite material can, in addition, include at least one further unfired and/or fired phyllosilicate as inorganic matrix material; the phyllosilicate may be naturally occurring phyllosilicates, such as kaolins, clays or bentonites, or synthetic phyllosilicates, such as magadiite or kenyaite or mixtures of these.

Preference is given to phyllosilicates which contain as little alkali metal as possible and at the same time have high formability. Particular preference is given to the corresponding clays or synthetic alkali-metal-free (sodium-free) phyllosilicates, e.g. magadiite.

The proportion of the phyllosilicate in the composite material is preferably less than 50% by weight, based on the inorganic binder content. Mixtures of inorganic binders and phyllosilicates are preferably suitable for casting. The phyllosilicates control the Theological properties of such aqueous mixtures.

Suitable aerogels for the novel composite material are those based on metal oxides which are suitable for the sol-gel technique (C. J. Brinker, G. W. Scherer, Sol-Gel Science, 1990, chapters 2 and 3), such as, for example, silicon or aluminum compounds, or those based on organic substances which are suitable for the sol-gel technique, such as melamine-formaldehyde condensates (U.S. Pat. No. 5,086,085) or resorcinol-formaldehyde condensates (U.S. Pat. No. 4,873,218). They can also be based on mixtures of the abovementioned materials. Preference is given to aerogels comprising silicon compounds, in particular $SiO_2$ aerogels and very particularly preferably $SiO_2$ xerogels. To reduce the radiative contribution to thermal conductivity, the aerogel can include IR opacifiers, such as, for example, carbon black, titanium dioxide, iron oxides or zirconium dioxide, or mixtures thereof.

In a preferred embodiment, the aerogel particles have hydrophobic surface groups. Groups suitable for permanent hydrophobization are, for example, trisubstituted silyl groups of the formula $-Si(R)_3$, preferably trialkylsilyl and/or triarylsilyl groups, where each R is independently an unreactive organic radical, such as $C_1$–$C_{18}$-alkyl or $C_6$–$C_{14}$-aryl, preferably $C_1$–$C_6$-alkyl or phenyl, in particular methyl, ethyl, cyclohexyl or phenyl, which may also be substituted by functional groups. Trimethylsilyl groups are particularly advantageous for permanent hydrophobization of the aerogel. These groups can be introduced as described in WO 94/25149 or by gas phase reaction between the aerogel and, for example, an activated trialkyleilane derivative, such as for example a chlorotrialkylsilane or a hexaalkyldisilazane (cf. R. Iler, The Chemistry of Silica, Wiley & Sons, 1979).

It is also the case that the thermal conductivity of the aerogels decreases with increasing porosity and with decreasing density. For this reason, aerogels having porosities greater than 60% and densities less than 0.6 g/cm$^3$ are preferred. Aerogels having densities less than 0.4 g/cm$^3$ are particularly preferred.

In order to reduce the radiative contribution to the thermal conductivity, the composite material can include IR opacifiers, such as, for example, carbon black, titanium dioxide, iron oxides or zirconium dioxide, or mixtures of these; this is particularly advantageous for applications at elevated temperatures.

In relation to cracking and to breaking strength, it may also be advantageous if the composite material contains fibers. The fibers can be organic fibers, such as polypropylene, polyester, nylon or melamine-formaldehyde fibers, and/or inorganic fibers, such as, for example, glass fibers, mineral or SiC fibers, and/or carbon fibers.

The flammability classification of the composite material obtained after drying is determined by the flammability classification of the aerogel and of the inorganic binder and, if used, of the fiber material. In order to obtain the best possible flammability classification for the composite material (low flammability or non-combustible), the fibers should consist of non-combustible material, for example mineral, glass or SiC fibers.

In order to avoid an increase in thermal conductivity caused by the added fibers, a) the proportion by volume of the fibers should be from 0.1 to 30%, preferably from 1 to 10%, and b) the thermal conductivity of the fiber material should preferably be <1 W/mK.

By means of a suitable choice of fiber diameter and/or fiber material, the radiative contribution to the thermal conductivity can be reduced and an increased mechanical strength can be achieved. For these purposes, the fiber diameter should preferably be in the range from 0.1 to 30 μm.

The radiative contribution to the thermal conductivity can be especially reduced if carbon fibers or carbon-containing fibers are used.

The mechanical strength can also be influenced by the length and distribution of the fibers in the composite material. The use of fibers having a length between 0.5 and 10 cm is preferred. For sheet-like shaped articles, fabrics composed of fibers may also be used.

The composite material may also contain other auxiliary materials, such as, for example, tylose, starch, polyvinyl alcohol and/or wax emulsions. In the prior art, these materials are employed industrially in the shaping of ceramic bodies.

If the material is used in the form of sheet-like structures, for example sheets, it can be laminated on at least one side with at least one covering layer in order to improve the properties of the surface, for example to increase wear resistance, to make the surface a vapor barrier or to protect it from easily becoming soiled. The covering layers can also improve the mechanical stability of articles made from the composite material. If covering layers are used on both surfaces, these may be the same or different.

Suitable covering layers are all the materials known to the person skilled in the art. They may be non-porous and thus effective as a vapor barrier; examples are plastic films, metal foils or metallized plastic films which reflect heat radiation. Porous covering layers, which permit the ingress of air into the material and thus give better sound insulation, can also be used; examples are porous films, papers, fabrics and webs. The matrix material itself can also be used as covering layer.

The covering layers may themselves also comprise a number of layers, and may be secured using the binder or using another adhesive.

The surface of the composite material can also be sealed and consolidated by the introduction into a surface layer of at least one suitable material.

A further object of the present invention is to provide a process for preparation of the novel composite material.

This object is achieved by a process which comprises
a) mixing the aerogel particles, the inorganic binder, the water and, if desired, fibers, phyllosilicate and/or auxiliary materials in a mixing device,
b) subjecting the mixture thus obtained to a shaping process,
c) drying the body thus obtained,
d) if desired, subjecting the dried body to green machining It is preferable, in step a), to precharge the solid constituents into the mixing device and then to add the liquid constituents.

It is particularly preferable to add a wax emulsion having a water content of about 50% to the dry starting weight of solid constituents. A further part of the necessary moisture can be achieved by adding waterglass. Additional water can be added to the mixture to the extent that this is necessary.

The content of mixing water can be used to modify the mechanical properties of the mixture. The characteristic Theological behavior of the mixture is also determined by the type, amount and combination of fibers, phyllosilicate and/or auxiliary materials in interaction with the properties of the aerogel particles and of the inorganic binder.

If the mixture contains phyllosilicates, it is preferably compounded in a mixer which exerts shearing forces on the mixture. The shearing forces have the purpose of opening up the phyllosilicates as completely as possible into individual platelets.

During the subsequent shaping process, for example an extrusion process, it is then possible to orientate the platelets of the phyllosilicates by means of the shearing forces and the shaping forces acting perpendicular to them. This orientation increases the mechanical strength. For application as heat insulating material, it is helpful in lowering the thermal conductivity. In addition, less phyllosilicate is needed to achieve the same physical properties.

Because of their plastic properties, phyllosilicates in particular can be mixed with water in such a way that they are capable of being extruded. The water content should be adjusted so that good formability of the mixture is ensured. The water content must be raised according to the capacity of the aerogel to absorb water.

In a preferred embodiment, the mixture is homogenized by increased addition of water in a mixer or stirred vessel. The viscosity is preferably set in the region from 100 to 2000 mPas. The mixture can then be deaerated before being poured into the desired mold.

The article obtained in the shaping process is dried and then, if required, subjected to green machining, i.e. trimmed to the desired size.

The novel composite materials are suitable, because of their low thermal conductivity, as shaped articles for heat insulation. Depending on the application, the article can be in the form of a sheet, strip or irregularly shaped body.

The invention is described in greater detail below by means of working examples; a hydrophobic aerogel based on tetraethyl orthosilicate (TEOS) and having a density of 0.17 g/cm$^3$ and a thermal conductivity of 30 mW/mK, prepared from trimethylchlorosilane analogously to the process published in WO 94/25149, was used in all experiments.

EXAMPLE 1

1000 ml of aerogel
200 g of gypsum α-hemihydrate
50 g of SAVC clay
40 g of tylose FL 6000×
250 ml of water
50 ml of Baykiesol are mixed by means of a stirrer in a vessel until the mixture appears homogeneous, i.e. the individual constituents cannot be differentiated with the naked eye.

The mixture is poured into a mold, left there for 3 hours and then removed. The shaped article is dried at 50° C. in order to remove excess moisture. The dried shaped article has a density of 0.6 g/cm$^3$ and a thermal conductivity of 0.2 W/mK.

EXAMPLE 2

1000 ml of aerogel
250 g of micropore cement
40 g of tylose FL 6000×
300 ml of water
100 ml of Baykiesol are mixed by means of a stirrer in a vessel until the mixture appears homogeneous, i.e. the individual constituents cannot be differentiated with the naked eye.

The mixture is poured into a mold, left there for 3 hours and then removed. The shaped article is dried at 50° C. in order to remove excess moisture. The dried shaped article has a density of 0.63 g/cm$^3$ and a thermal conductivity of 0.25 W/mK.

EXAMPLE 3

1000 ml of aerogel
50 g of SAVC clay
40 g of tylose
300 ml of Baykiesol are mixed by means of a stirrer in a vessel until the mixture appears homogeneous, i.e. the individual constituents cannot be differentiated with the naked eye.

The mixture is poured into a mold, left there for 3 hours and then removed. The shaped article is then calcined at 600° C. for 30 minutes. The calcined shaped article has a density of 0.45 g/cm$^3$ and a thermal conductivity of 0.15 W/mK.

What is claimed is:
1. A composite material comprising from 10 to 95% by volume of aerogel particles and at least one inorganic binder, selected from the group consisting of cement, lyme and gypsum, wherein the particle diameter of the aerogel particles is less than 0.5 mm.

2. A composite material as claimed in claim 1, wherein the composite material additionally comprises a phyllosilicate.

3. A composite material as claimed in claim 1, wherein the aerogel is an $SiO_2$ aerogel.

4. A composite material as claimed in claim 1, wherein the aerogel particles have hydrophobic surface groups.

5. A composite material as claimed in claim 1, wherein the aerogel particles have porosities greater than 60% and densities less than 0.6 $g/cm^3$.

6. A composite material as claimed in claim 1, wherein the composite material includes from 0.1 to 30% by volume of fibers.

7. A composite material as claimed in claim 1, wherein the composite material includes auxiliary materials.

8. A composite material as claimed in claim 1, wherein the composite material is in the form of the sheet and is laminated, on at least one side with at least one covering layer.

9. A process for producing a composite material as claimed in claim 1, which comprises a) mixing the aerogel particles, the inorganic binder, water and, optionally, fibers, phyllosilicate and/or auxiliary materials in a mixing device, b) subjecting the mixture thus obtained to a shaping process, c) drying the body thus obtained, d) optionally, subjecting the dried body to green machining.

10. The process as claimed in claim 9, which comprises carrying out the shaping by a) adjusting the viscosity of the mixture obtained within the range from 100 to 2000 mPas by addition of water, b) if necessary, deaerating the mixture obtained, and c) pouring the latter mixture into the desired mold.

11. The method of using a composite material as claimed in claim 1 for heat insulation.

* * * * *